(12) United States Patent
Du Tertre et al.

(10) Patent No.: US 12,496,783 B2
(45) Date of Patent: Dec. 16, 2025

(54) METHOD FOR ASSEMBLING A FIRST METAL PART WITH A SECOND PART MADE OF AN ORGANIC MATRIX COMPOSITE MATERIAL

(71) Applicants: ARIANEGROUP SAS, Paris (FR); CENTRE NATIONAL D'ETUDES SPATIALES, Paris (FR)

(72) Inventors: Alban Du Tertre, Les Mureaux (FR); Didier Guichard, Les Mureaux (FR)

(73) Assignee: ARIANEGROUP SAS, Les Mureaux (FR)

( * ) Notice: Subject to any disclaimer, the term of this patent is extended or adjusted under 35 U.S.C. 154(b) by 242 days.

(21) Appl. No.: 17/999,332

(22) PCT Filed: May 10, 2021

(86) PCT No.: PCT/FR2021/050804
§ 371 (c)(1),
(2) Date: Nov. 18, 2022

(87) PCT Pub. No.: WO2021/234242
PCT Pub. Date: Nov. 25, 2021

(65) Prior Publication Data
US 2023/0202121 A1 Jun. 29, 2023

(30) Foreign Application Priority Data
May 20, 2020 (FR) ........................ 2005271

(51) Int. Cl.
*B23K 31/02* (2006.01)
*B22F 5/00* (2006.01)
(Continued)

(52) U.S. Cl.
CPC .......... *B29C 66/5221* (2013.01); *B22F 5/008* (2013.01); *B22F 10/25* (2021.01);
(Continued)

(58) Field of Classification Search
CPC .............. B29C 66/5221; B29C 65/562; B29C 66/1222; B29C 66/7392; B29C 66/7394;
(Continued)

(56) References Cited

U.S. PATENT DOCUMENTS 5,570,573 A 11/1996 Bonnelie
2007/0194085 A1* 8/2007 Spinella ................ C04B 37/006
228/101

(Continued)

FOREIGN PATENT DOCUMENTS

CN 102126064 A 7/2011
EP 3159525 A1 4/2017

(Continued)

OTHER PUBLICATIONS

French Search Report issued in French Application No. FR2005271 on Feb. 4, 2021 (7 pages).

(Continued)

*Primary Examiner* — Jun S Yoo
(74) *Attorney, Agent, or Firm* — Bookoff McAndrews, PLLC

(57) ABSTRACT

The invention relates to a method for assembling a first metal part with a second part made of an organic matrix composite material, the first part having a first connecting portion and the second part having a second connecting portion, the method comprising the steps of:
   causing the first connecting portion and the second connecting portion to overlap, a through-hole of the second connecting portion opening onto the first connecting portion,
   forming a protective layer on the side wall of the through-hole,
   forming a seal between the protective layer and the first connecting portion, and
   (Continued)

forming, by additive manufacturing using cold gas spray deposition of metal powder, a fastening element which extends into the through-hole, is fastened to the first connecting portion and encloses the second connecting portion.

7 Claims, 6 Drawing Sheets

(51) Int. Cl.
| | |
|---|---|
| *B22F 10/25* | (2021.01) |
| *B29C 65/00* | (2006.01) |
| *B29C 65/56* | (2006.01) |
| *F02K 9/34* | (2006.01) |
| *B29L 31/00* | (2006.01) |
| *B33Y 80/00* | (2015.01) |

(52) U.S. Cl.
CPC ........ *B29C 65/562* (2013.01); *B29C 66/1222* (2013.01); *B29C 66/7392* (2013.01); *B29C 66/7394* (2013.01); *B29C 66/742* (2013.01); *F02K 9/346* (2013.01); *B29L 2031/749* (2013.01); *B33Y 80/00* (2014.12)

(58) Field of Classification Search
CPC ... B29C 66/742; B29C 65/64; B29C 66/1224; B29C 66/21; B29C 66/721; B29C 66/54; B22F 5/008; B22F 10/25; B22F 7/08; B22F 3/115; B22F 5/009; B22F 7/062; F02K 9/346; F02K 9/62; F02K 9/42; F02K 9/97; F02K 9/54; F02K 1/04; B29L 2031/749; B29L 2031/7504; B33Y 80/00; B33Y 10/00; B23K 2103/08; B23K 2103/16; B23K 2103/18; B23K 9/044; B23K 2101/001; B23K 9/007; B23K 9/232; B23K 9/23; B23K 33/00; Y02P 10/25; B66C 66/55; F16B 5/08

See application file for complete search history.

(56) References Cited

U.S. PATENT DOCUMENTS

| | | | |
|---|---|---|---|
| 2007/0241164 A1* | 10/2007 | Barnes | .................... C23C 24/04 228/101 |
| 2014/0161520 A1 | 6/2014 | Clark et al. | |
| 2016/0326891 A1 | 11/2016 | Roach et al. | |
| 2016/0362144 A1* | 12/2016 | Potthast | ................. B23K 31/02 |
| 2017/0341732 A1 | 11/2017 | Schneider et al. | |
| 2018/0050496 A1 | 2/2018 | Racineux et al. | |

FOREIGN PATENT DOCUMENTS

| | | |
|---|---|---|
| EP | 3498410 A1 | 6/2019 |
| GB | 2550966 A | 12/2017 |
| JP | S62083381 A | 5/1987 |
| JP | H06200951 A | 7/1994 |
| JP | H08243753 A | 9/1996 |
| JP | H09170500 A | 6/1997 |
| JP | 2000170996 A | 6/2000 |
| JP | 2000254774 A | 9/2000 |
| JP | 2013208861 A | 10/2013 |
| JP | 2017082791 A | 5/2017 |
| JP | 2018089657 A | 6/2018 |
| JP | 2018149570 A | 9/2018 |
| JP | 2019043111 A | 3/2019 |
| JP | 2019104986 A | 6/2019 |
| JP | 2023526532 A | 6/2023 |
| WO | 2018030272 A1 | 2/2018 |

OTHER PUBLICATIONS

International Search Report issued in International Application No. PCT/FR2021/050804 on Aug. 17, 2021 (2 pages).

Search Report issued in corresponding application JP2023526520A, issued Mar. 26, 2025.

Notice of Reasons for Refusal issued in corresponding JP 2022-571234, issued Apr. 25, 2025.

* cited by examiner

[Fig. 1]
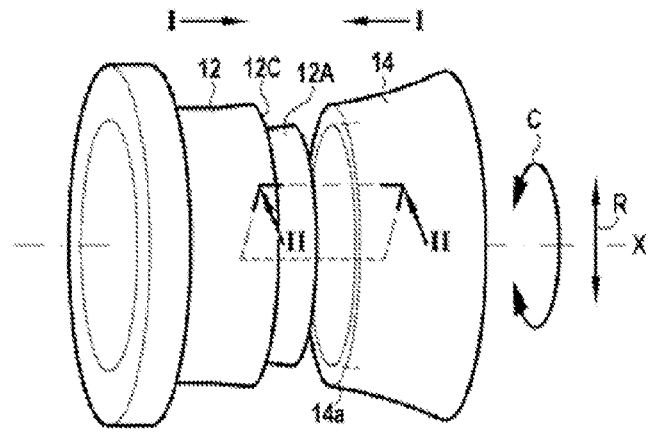
[Fig. 2A-2B]
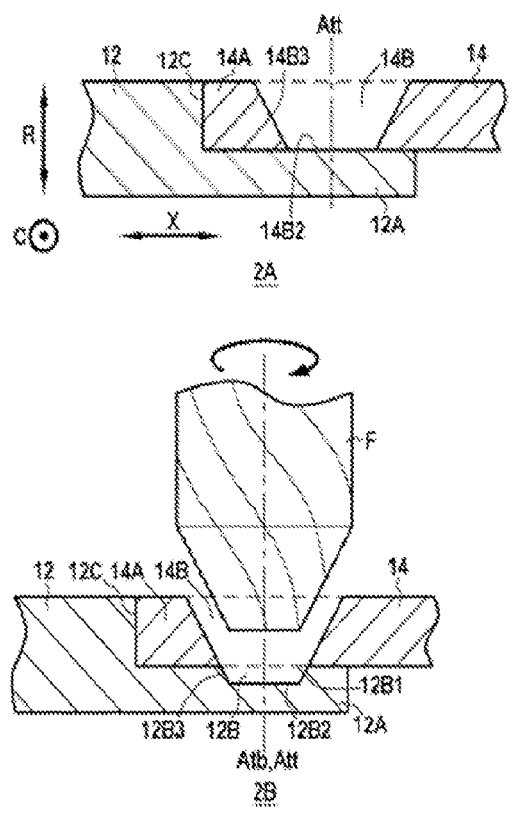

[Fig. 3A-3B]
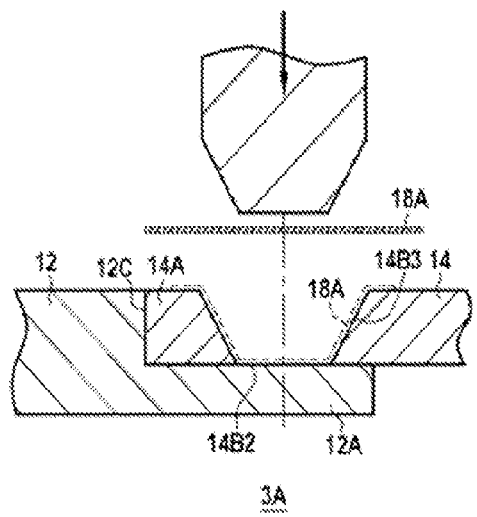
3A
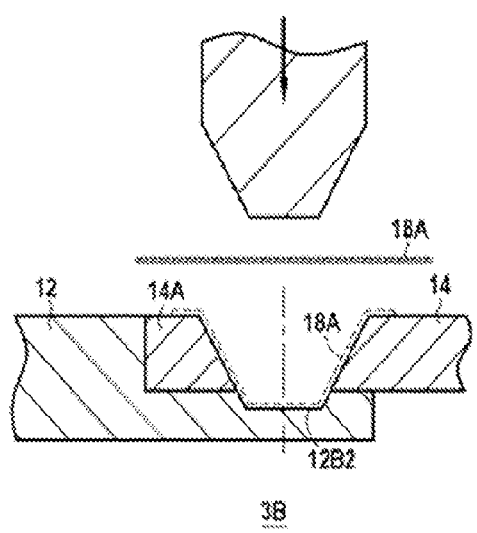
3B

[Fig. 4A-4B]
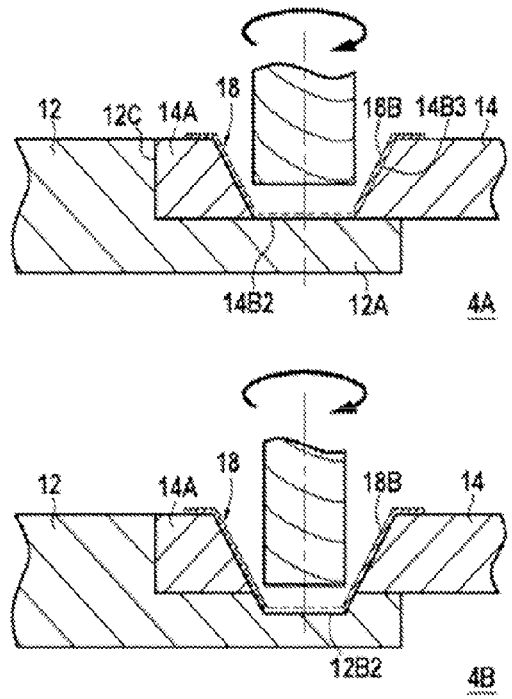
[Fig. 5A-5B]
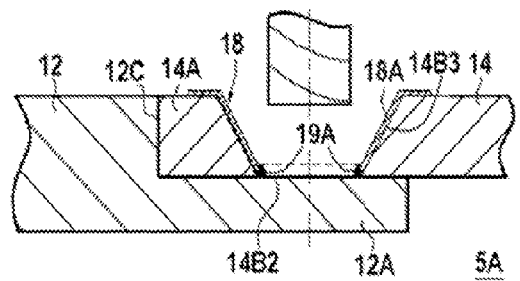
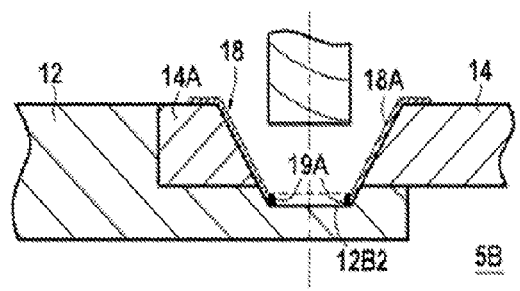

[Fig. 6A-6D]
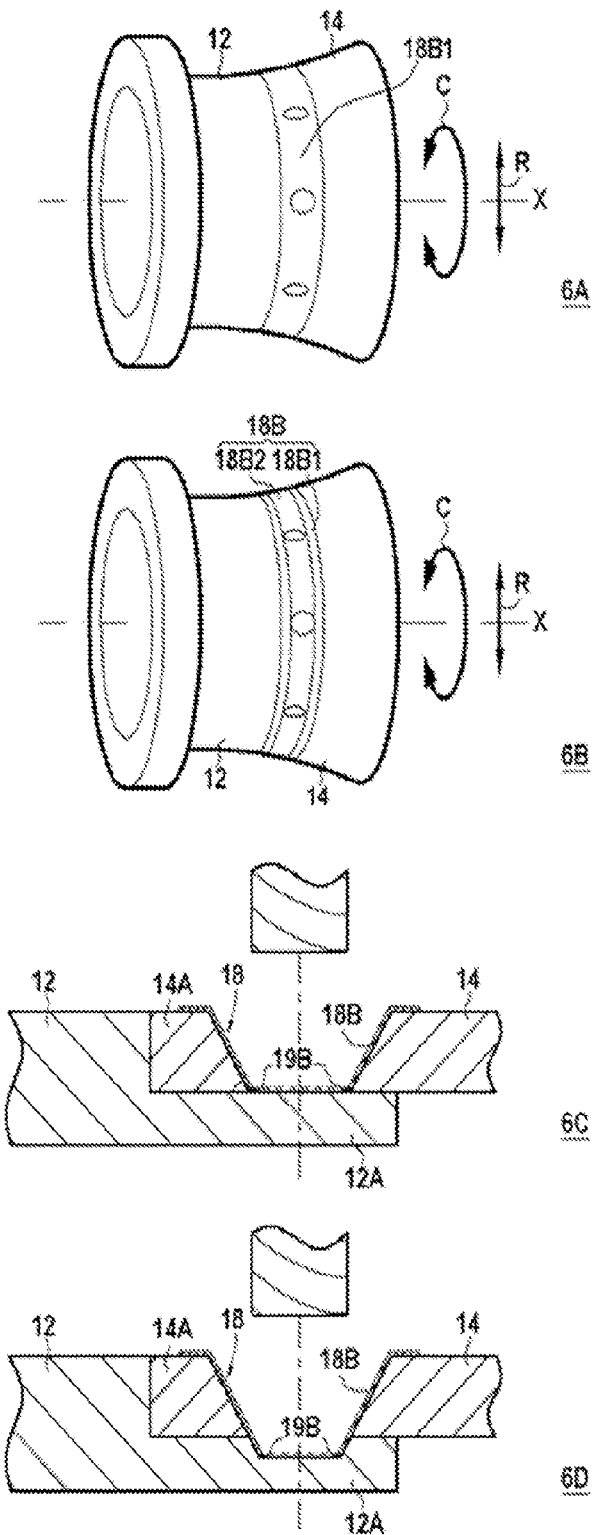

[Fig. 7A-7B]
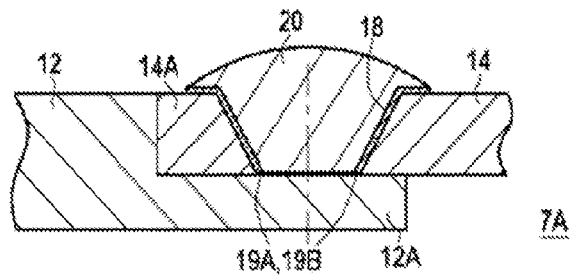
7A
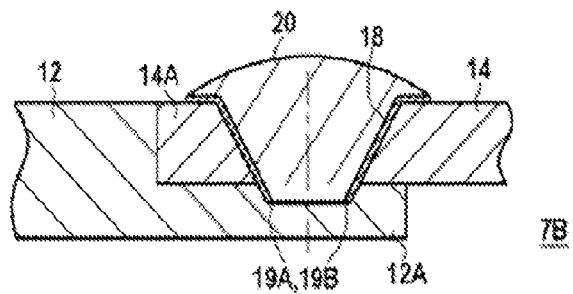
7B
[Fig. 8]
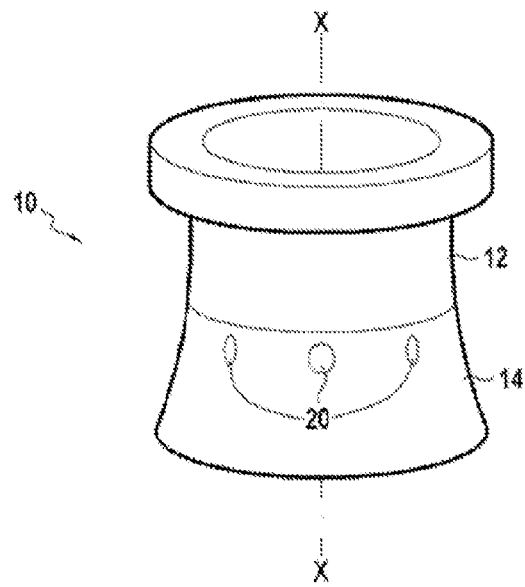

[Fig. 9]
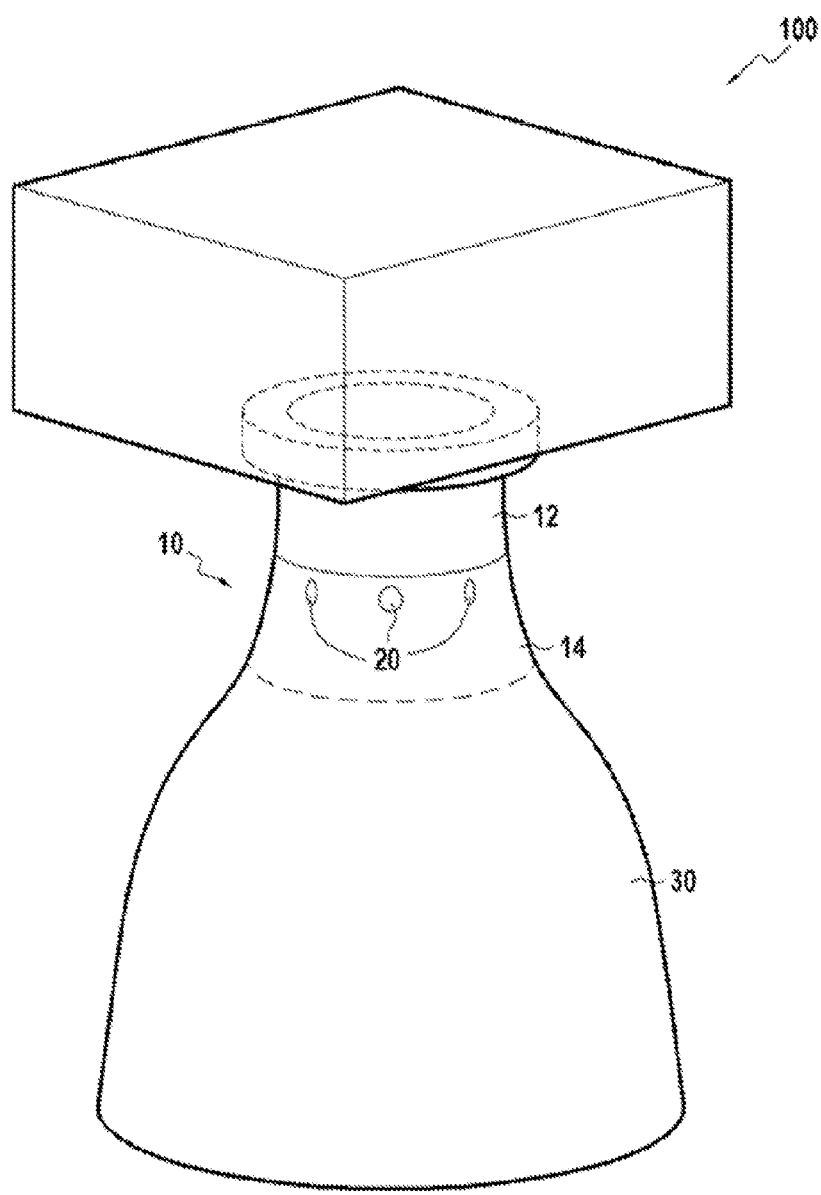

METHOD FOR ASSEMBLING A FIRST METAL PART WITH A SECOND PART MADE OF AN ORGANIC MATRIX COMPOSITE MATERIAL

TECHNICAL FIELD

The present disclosure relates to method of assembling two parts of a piece, one part being metallic and the other part being made of organic matrix composite material. For example, such a piece may be, but is not limited to, a rocket engine combustion chamber jacket.

PRIOR ART

Methods are known for assembling a metal part and a part made of organic matrix composite material. However, these assembly methods can very often be improved. A need therefore exists in this context.

DISCLOSURE OF THE INVENTION

An embodiment relates to a method for assembling a first metal part with a second part made of an organic matrix composite material, the first part having a first connecting portion and the second part having a second connecting portion, the method comprising the steps of:
  causing the first connecting portion and the second connecting portion to overlap, a through-hole of the second connecting portion opening onto the first connecting portion, the through-hole having a side wall,
  forming a protective layer at least on the side wall of the through-hole,
  forming a seal between the protective layer and the first connecting portion, and
  forming, by additive manufacturing using cold gas spray deposition of metal powder, also known by the acronym CGS for "Cold Gas Spraying", a fastening element which extends into the through-hole, fastened to the first connecting portion and enclosing the second connecting portion.

It is understood that the connecting portion of one part is the portion which is configured to be in contact and cooperate directly with the other part. Hence, a portion of a part which does not cooperate with the other part, for example which is not superposed with, or does not overlap, the connecting portion of the other part, is not part of the connecting portion of said part.

It is also understood that the second connecting portion has one or more through-holes. In the following, and unless indicated otherwise, "the through-hole shall mean "the at least one through-hole". According to a first alternative, the hole is formed before the implementation of the method, the second connecting portion exhibiting the through-hole before the two connecting portions are caused to overlap. According to a second alternative, the second connecting portion does not have a through-hole before the implementation of the method, the through-hole being formed during an intermediate step after the two connecting portions are caused to overlap. In this case, a blind hole may or may not be formed in the first connecting portion during this intermediate step. A blind hole is understood to be a hole which is only a single orifice and which forms a concavity. Such a blind hole can improve the attachment of the fastening element to the first connecting portion. In the case of a blind hole, the protective layer can, for example, also extend over the side walls of the blind hole and the seal can be formed between the protective layer and the bottom of the blind hole.

It is understood that additive manufacturing using cold gas spray deposition of metal powder is a manufacturing method in which the metal is deposited at a temperature less than its melting temperature. Such a deposition method is particularly suitable for assembling the second part because it ensures that the temperature of the metal during the deposition remains less than the deterioration temperature of the organic matrix composite material of the second part. Subsequently, and unless indicated otherwise, "CGS deposition" shall mean "additive manufacturing using cold gas spray deposition of metal powder".

For example the fastening element is, but is not necessarily, made of a grade of metal identical to that of the first part. The fastening element encloses all or part of the second connecting portion. In other words, the second connecting portion is totally or partially sandwiched between the fastening element and the first connecting portion. The fastening element can have various forms. For example, the fastening element can be in the form of a pin, a bridging piece, an annular flange, etc.

It is understood that the protective layer is a layer that can protect the second part during the formation by CGS deposition of the fastening element. It is understood that the seal connects the protective layer and the first connecting portion in a sealed manner. Of course, at least one surface portion of the first connecting portion remains free (i.e. is not covered by the seal or by the protective layer) from the through-hole so as to be able to form the fastening element directly on this free surface portion, in order to fasten the fastening element on the first connecting portion. In the following, and unless indicated otherwise, "joint" means a "seal".

The inventors noted that during the formation of the fastening element by CGS deposition in the methods of the prior art, a part of the sprayed material could escape between the first connecting portion and the second connecting portion. This leads both to abrasion of the second connecting portion (the metal particles which escape, attack the composite material of the second part) and to defects in the fastening element, in particular at the interface of the fastening element and first connecting portion. The inventors have observed that this weakens the mechanical strength of the assembly.

By forming a seal between the protective layer and the first connecting portion, the material sprayed during the CGS deposition can no longer escape, so that the fastening element can be formed without defects at its join with the first connecting portion, and without damaging the second connecting portion.

The mechanical strength of the assembly is clearly improved relative to the assemblies obtained from the methods of the prior art.

For example, the parts can be flat or curved plates, and the fastening portions can form flat or curved flanges.

For example, the first part and the second part each form a plate extending in a first direction and in a second direction, and having a thickness in a third direction perpendicular to the first and second direction, the first part and the second part being arranged side-by-side in the first direction, the at least one through-hole extending in the third direction, the first and second connecting portion overlapping one another in the first and second direction. The first and/or second direction can be straight or curved, in a manner similar to the directions defined in a Cartesian, cylindrical or spherical coordinate system.

In certain embodiments, the protective layer extends over the entire interface between the second connecting portion and the fastening element.

For example, the fastening element can cooperate with the second part on surfaces other than the side surface of the hole. In this case, a protective layer as defined above can perfectly protect the second part, over all the surfaces configured to cooperate with the fastening element, during formation of the fastening element.

In certain embodiments, the protective layer is formed using a metal sheet.

For example, the metal sheet has an initially planar shape, is applied on the second connecting portion and is then deformed so as to conform to the shape of all or part of the second connecting portion, in particular of the side wall of the hole. For example, the metal sheet is then machined, for example by milling, so as to leave a free access to the bottom of the hole, i.e. to the first connecting portion. For example, the metal sheet is made of metal that is more easily plastically deformable than the material of the first and/or second connecting portion. For example, the metal sheet is a sheet of gold, silver, aluminium, copper, etc.

In certain embodiments, the seal is formed between the metal sheet and the first connecting portion by metal deposition by metal arc wire additive manufacturing.

Subsequently and unless indicated otherwise, "arc wire deposition" shall mean "metal arc wire additive manufacturing". Such a deposition is very unaggressive, from both the thermal and abrasion point of view, for the substrate on which it is applied, and is particularly well-suited to the second part and to the metal layer. This ensures the integrity of the metal layer and of the second part, and therefore ultimately the solidity of the assembly.

An arc wire deposition enables a direct application of soft metal allowing the interstices/gaps to be filled and a robust and reliable seal to be formed.

For example, the arc wire deposition covers all of the walls of the hole, including the bottom, a part of the bottom of the hole is then machined, for example by milling, in such a way as to leave a free access to the bottom of the hole, i.e. to the first connecting portion, while preserving a portion of the arc wire deposition extending from the metal sheet to the first connecting portion, this portion forming the seal. For example, the metal of the arc wire deposition can be, but is not necessarily, the same as the metal of the metal sheet. This can enable a satisfactory adherence between the metal sheet and the arc wire deposition.

In certain embodiments, the protective layer and the seal are formed simultaneously by at least one metal deposition by metal arc wire additive manufacturing.

Forming the protective layer and the seal during the same step, saves time. Moreover, by reducing the number of steps, the number of interventions is also reduced and therefore the risk of deteriorating the first and/or the second connecting portion.

In certain embodiments, the protective layer and the seal are formed simultaneously by at least two metal depositions, a first deposition being a metal deposition by metal arc wire additive manufacturing, and a second deposition being a cold gas spray deposition of metal powder carried out on the first deposition, the second deposition being distinct from the step of additive manufacturing using cold gas spray deposition of metal powder, in order to form the fastening element.

In other words, the protective layer and the seal are formed in at least two passes: at least a first pass by arc wire deposition and at least a second pass by CGS deposition. For example, the metal of the first and second deposition at the bottom of the hole is removed (while leaving a portion forming the seal between the first and second connecting portion) before forming the fastening element. In other words, the seal and the protective layer can form, in this example, a single and same continuous element. For example, the same material, for example copper, can be, but is not necessarily, used for the first deposition and for the second deposition. For example, in the case of a rotationally symmetric piece, the first layer and/or the second layer can be a deposition of a continuous circumferential layer.

An embodiment relates to a method for manufacturing a rocket engine combustion chamber jacket comprising the assembly method according to any one of the embodiments described in the present disclosure.

The assembly method according to the present disclosure is particularly well-suited for a rocket engine combustion chamber jacket.

An embodiment relates to a piece comprising a first metal part and a second part made of organic matrix composite material assembled together by the assembly method according to any one of the embodiments described in the present disclosure.

BRIEF DESCRIPTION OF THE FIGURES

The object of the present disclosure and its advantages will be better understood on reading the following detailed description of various embodiments presented by way of non-limiting examples. This description refers to the attached pages of figures, in which:

FIG. 1 shows a first step of the assembly method.

FIGS. 2A and 2B respectively show two alternatives of the assembly method.

FIGS. 3A and 3B show a second step of the assembly method, respectively for the two alternatives of FIGS. 2A and 2B, according to a first embodiment.

FIGS. 4A and 4B show a third step of the assembly method, respectively for the two alternatives of FIGS. 2A and 2B, according to the first embodiment.

FIGS. 5A and 5B show a fourth step of the assembly method, respectively for the two alternatives of FIGS. 2A and 2B, according to the first embodiment.

FIGS. 6A, 6B, 6C and 6D show respectively three intermediate steps for simultaneously producing the protective layer and the seal, respectively for the two alternatives of FIGS. 2A and 2B, according to a second embodiment.

FIGS. 7A and 7B show a fifth step of the assembly method, respectively for the two alternatives of FIGS. 2A and 2B.

FIG. 8 shows a rocket engine combustion chamber outer jacket, obtained using the assembly method according to the first or second embodiment.

FIG. 9 shows a rocket engine equipped with the rocket engine combustion chamber outer jacket of FIG. 8.

DESCRIPTION OF THE EMBODIMENTS

For clarity of the present disclosure, it is noted that the views of the figures are very schematic. The method for assembling a first metal part 12 with a second part 14 made of an organic matrix composite material is described with reference to FIGS. 1 to 7. For example, the first part 12 is made of metal alloy, for example a nickel-based alloy, while the second part 14 is made of thermoplastic or thermosetting, organic matrix composite material. It is noted that FIGS. 2A, 2B, 3A, 3B, 4A, 4B, 5A, 5B, 6C and 6D are sectional views along the plane II of FIG. 1. The first and second steps of FIGS. 1, 2A and 2B, as well as the fifth step of FIGS. 7A and 7B, are common to the first and second embodiment, FIGS. 3A, 3B, 4A, 4B, 5A and 5B belonging to the first embodiment while FIGS. 6A, 6B, 6C and 6D belong to the second embodiment.

In this example, the first and second parts 12 and 14 are rotationally symmetric parts. More particularly, the first and second parts 12 and 14 each have a substantially annular plate shape extending in an axial direction X (rotational symmetry axis), a radial direction R and a circumferential direction C. The radial direction R is a direction perpendicular to the axis X. The azimuthal or circumferential direction C corresponds to the direction describing a ring around the axial direction X. The three directions, axial, radial and azimuth respectively correspond to the directions defined by the height, radius and angle in a cylindrical coordinate system.

The first part has a first connecting portion 12A comprising a shoulder 12C. The shoulder 12C extends transversely to the axial direction X. In other words, in this example, the shoulder 12C extends in the radial direction R and circumferential C direction. The first connecting portion 12A thus forms a step receiving a second connecting portion 14A of the second part 14.

During the first step shown in FIG. 1, the first and second part 12 and 14 approach each other along the axial direction X, as indicated by the arrows I, until the second part 14 engages in abutment against the shoulder 12C, so as to cause the first connecting portion 12A and second connecting portion 14A to overlap.

According to a first alternative shown in FIG. 2A, the second connecting portion 14A is provided with at least one through-hole 14B before the first step. The through-hole 14B extends in the radial direction R and opens onto the first connecting portion 12A. In this example, the through-hole 14B is frustoconical, the side wall 14B3 being uniformly inclined relative to the axis Att, converging in the radial direction towards the first connecting portion 12A. Any other shape of through-hole is possible. In this example, the first connecting portion 12A does not have a blind hole, but could comprise a blind hole, formed before the first step, or even after the first step as described below with reference to the second alternative of FIG. 2B.

According to a second alternative shown in FIG. 2B, the second connecting portion 14A is not provided with any through-holes before the first step. At least one through-hole 14B is formed after the first step, for example using a drill bit F. In this example, when drilling the through-hole 14B in the second connecting portion 14A, a blind hole 12B is also drilled in the first connecting portion 12A, in the extension of the through-hole 14B. The through-hole 14B and the blind hole 12B extend in the radial direction R. The through-hole 14B is similar to that described with reference to FIG. 2A. The blind hole 12B has a geometric axis Atb which extends in the radial direction between an inlet 12B1 and a bottom 12B2, and has a side wall 12B3 extending between the inlet 12B1 and the bottom 12B2. In this example, the blind hole 12B is frustoconical, the side wall 12B3 being uniformly inclined relative to the axis Atb, converging from the inlet 12B1 towards the bottom 12B2. Any other shape of blind hole is possible. According to an alternative, the blind hole 12B is present before the first step, but not the through-hole 14B.

A protective layer 18 is then formed at least on the side wall 14B3 of the through-hole 14B. The protective layer 18 can, for example, be formed according to the first embodiment or according to the second embodiment described below.

According to the first embodiment, during a second step, as shown in FIGS. 3A and 3B, a metal sheet 18A can be arranged, for example, on the second connecting portion 14A, opposite the first connecting portion 12A, and the metal sheet 18A is then stamped so that it conforms to the walls of the hole 14B (FIG. 3A, first alternative) or the walls of the holes 14B and 12B (FIG. 3B, second alternative). In FIGS. 2A and 2B, the stamped metal sheet 18A is shown as broken lines. In this example, the sheet 18A is made of copper.

Subsequently, during a third step, the portion of the metal sheet 18B which extends over the bottom of the hole is machined, in this example by milling, as shown in FIGS. 4A and 4B, so as to reveal the first connecting portion 12A at the bottom of the holes. In other words, after machining, the bottoms 14B2/12B2 of the holes are formed by the first connecting portion 12A. In FIGS. 4A and 4B, the machined and removed parts of the metal sheet 18A are shown as broken lines.

In FIG. 4A, the first connecting portion 12A does not have a blind hole (cf. first alternative) and the protective layer 18 extends over the entire radial height of the through-hole 14B, to the first connecting portion 12A. In FIG. 4B, the first connecting portion 12A has a blind hole 12B (cf. second alternative) and the protective layer 18 extends over the entire radial height of the through-hole 14B and of the blind hole 12B, to the bottom 12B2 of the blind hole 12B.

Then, during a fourth step, a seal 19 is formed between the protective layer 18 and the first connecting portion 12A, as shown in FIGS. 5A (first alternative) and 5B (second alternative). In this example, the seal 19A is formed by arc wire deposition of the seal 19A between the metal sheet 18A and the first connecting part 12A. In this example, the metal used to form the seal is copper or a copper-based alloy.

The arc wire deposition covers the bottom 14B2/12B2 of the holes, then, in a manner similar to the third step above, the arc wire deposition is machined so as to reveal the first connecting portion 12A at the bottom of the holes, taking care not to alter the seal 19A extending between the metal sheet 18A and the first connecting part 18A. For example, the diameter of the mill used for this step is smaller than that of the mill used for the third step. In FIGS. 5A and 5B, the machined and removed parts of the arc wire deposition are shown as broken lines.

According to the second embodiment, shown in FIGS. 6A, 6B, 6C and 6D, the protective layer 18 and a seal 19B are formed simultaneously by arc wire deposition. More precisely, in this example, a first arc wire deposition is produced in the circumferential direction C by forming one or more annular strips 18B1 along the desired axial width, as shown in FIG. 6A. In this example, this first deposition 18B1 is copper. The side walls 14B3 of the through-holes 14B are covered over their entire radial height. In this example, the surface of the first connecting portion 12A revealed through the through-holes 14B is also covered. A second CGS deposition is then carried out in the circumferential direction C forming one or more annular strips 18B2 according to the desired axial wet, covering, in this example partially, the circumferential strips 18B1. The annular strip 18B2 extends over the entire outer periphery in the circumferential direction C of the second connecting portion 14A, as shown in FIG. 6B, covering the side walls 14B3 of the through-holes 14B over their entire radial height. In this example, the surface of the first connecting portion 12A revealed through the through-holes 14B, covered by the strip 18B1, is also covered by the strip 18B2. In this example, the second deposition 18B2 is copper. According to an alternative, the annular strip 18B2 entirely covers the axial strips 18B1. In this second embodiment, the protective layer 18 is thus formed by a deposition layer 18B, resulting from the strips 18B1 and 18B2. By forming such strips, the protective layer 18 also extends in the vicinity of the through-hole 14B, opposite the first connecting portion 12A. During the two arc wire and CGS depositions for forming the annular strips, a seal 19B is produced simultaneously between the layer 18B and the first connecting portion 12A, as shown in FIGS. 6C (first alternative) and 6D (second alternative). Indeed, the protective layer 18B is formed in contact with first connecting portion 12A. In a similar manner to the first embodiment, the portion of the layer 18B which extends over the bottom of the hole is then machined, in this example by milling, as shown in FIGS. 6C and 6D, so as to reveal the first connecting portion 12A at the bottom of the holes. In other words, the bottoms 14B2/12B2 of the holes are formed by the first connecting portion 12A. During this operation, care is taken not to alter the portion 19B forming the seal. In FIGS. 6C and 6D, the machined and removed parts are shown as broken lines.

Finally, during a fifth step common to the first and second embodiment, a fastening element 20 is formed by CGS deposition, as shown in FIGS. 7A (first alternative) and 7B (second alternative). For example, the fastening element 20 is manufactured from metal alloy, for example from a nickel-based alloy. The fastening element 20 extends through the through-hole 14B, is fastened to the first connecting portion 12A, (i.e. on the bottoms 14B2, 12B2) and encloses, with the first connecting portion 12A, the second connecting portion 14A. In particular, it is noted that the fastening element 20 encloses the second connecting portion 14A, in particular via the side wall 14B3 of the through-hole 14B which is inclined relative to the axis Att of the through-hole 14B. In other words, the side wall 14B3 forms a seat for the fastening element 20 which enables the first part 12 to be fastened to the second part 14. In this example, the interface between the fastening element 20 and the second connecting portion 14A extends to the vicinity of the through-hole 14B, vicinity facility forming part of the seat cooperating with the fastening element 20. The fastening element 20 also encloses the second fastening portion 14A in this vicinity. According to an alternative, there are as many point attachment elements as through-holes 14B. According to another alternative (not shown), a single fastening element forming an annular flange extends all the way around the second connecting portion 14A in the circumferential direction C and in all the through-holes 14B. According to yet another alternative (not shown), the fastening element forms a bridging piece fastened to the first part 12 both on the first connecting portion 12A via the through-hole of the second connecting portion (14A) and on a portion of the first part other than the first connecting portion 12A (for example the portion of the first part 12 on the left in FIGS. 7A and 7B).

FIG. 8 shows the piece 10 resulting from the assembly described above. In this example, there are as many fastening elements 20 as through-holes. In this example, the piece 10 is a rocket engine combustion chamber jacket. In this example, the assembly method described above is part of a method for manufacturing a rocket engine combustion chamber jacket.

FIG. 9 shows a rocket engine 100 comprising the combustion chamber jacket 10 opening onto an exhaust nozzle 30.

Although the present invention has been described by referring to specific embodiments, it is obvious that modifications and changes can be made to these examples without going beyond the general scope of the invention as defined by the claims. In particular, the individual features of different embodiments illustrated or mentioned can be combined in additional embodiments. Consequently, the description and the drawings should be considered as illustrating rather than limiting.

It is also obvious that all the features described in reference to a method can be transposed, alone or in combination, to a device, and inversely, all the features described in reference to a device can be transposed, alone or in combination, to a method.

The invention claimed is:

1. A method for assembling a first metal part with a second part made of an organic matrix composite material, the first part having a first connecting portion and the second part having a second connecting portion, the method comprising:
   overlapping the first connecting portion and the second connecting portion, such that a through-hole of the second connecting portion opens onto the first connecting portion, wherein the through-hole has a side wall,
   forming a protective layer at least on the side wall of the through-hole,
   forming a seal between the protective layer and the first connecting portion, and
   forming, by additive manufacturing using cold gas spray deposition of metal powder, a fastening element which extends into the through-hole, fastened to the first connecting portion and enclosing the second connecting portion.

2. The assembly method according to claim 1, wherein the protective layer extends over an entire interface between the second connecting portion and the fastening element.

3. The assembly method according to claim 1, wherein the protective layer is formed using a metal sheet.

4. The assembly method according to claim 3, wherein the seal is formed between the metal sheet and the first connecting portion by metal disposition by metal arc wire additive manufacturing.

5. The assembly method according to claim 1, wherein the protective layer and the seal are formed simultaneously by at least one metal deposition by metal arc wire additive manufacturing.

6. The assembly method according to claim 5, wherein the protective layer and the seal are formed simultaneously by at least two metal depositions, a first deposition being a metal deposition by metal arc wire additive manufacturing, and a second deposition being a cold gas spray deposition of metal powder carried out on the first deposition, the second deposition being distinct from the step of additive manufacturing using cold gas spray deposition of metal powder, in order to form the fastening element.

7. The method for manufacturing a rocket engine combustion chamber jacket comprising the assembly method according to claim 1.

* * * * *

UNITED STATES PATENT AND TRADEMARK OFFICE
CERTIFICATE OF CORRECTION

Page 1 of 1

PATENT NO. : 12,496,783 B2
APPLICATION NO. : 17/999332
DATED : December 16, 2025
INVENTOR(S) : Alban Du Tertre and Didier Guichard It is certified that error appears in the above-identified patent and that said Letters Patent is hereby corrected as shown below:

On the Title Page

Item (71), Applicants, delete "ARIANEGROUP SAS, Paris (FR)" and insert --ARIANEGROUP SAS, Les Mureaux (FR)--.

Item (71), Applicants, delete "CENTRE NATIONAL D'ETUDES SPATIALES, Paris (FR)".

Signed and Sealed this
Twentieth Day of January, 2026

John A. Squires
*Director of the United States Patent and Trademark Office*